UNITED STATES PATENT OFFICE.

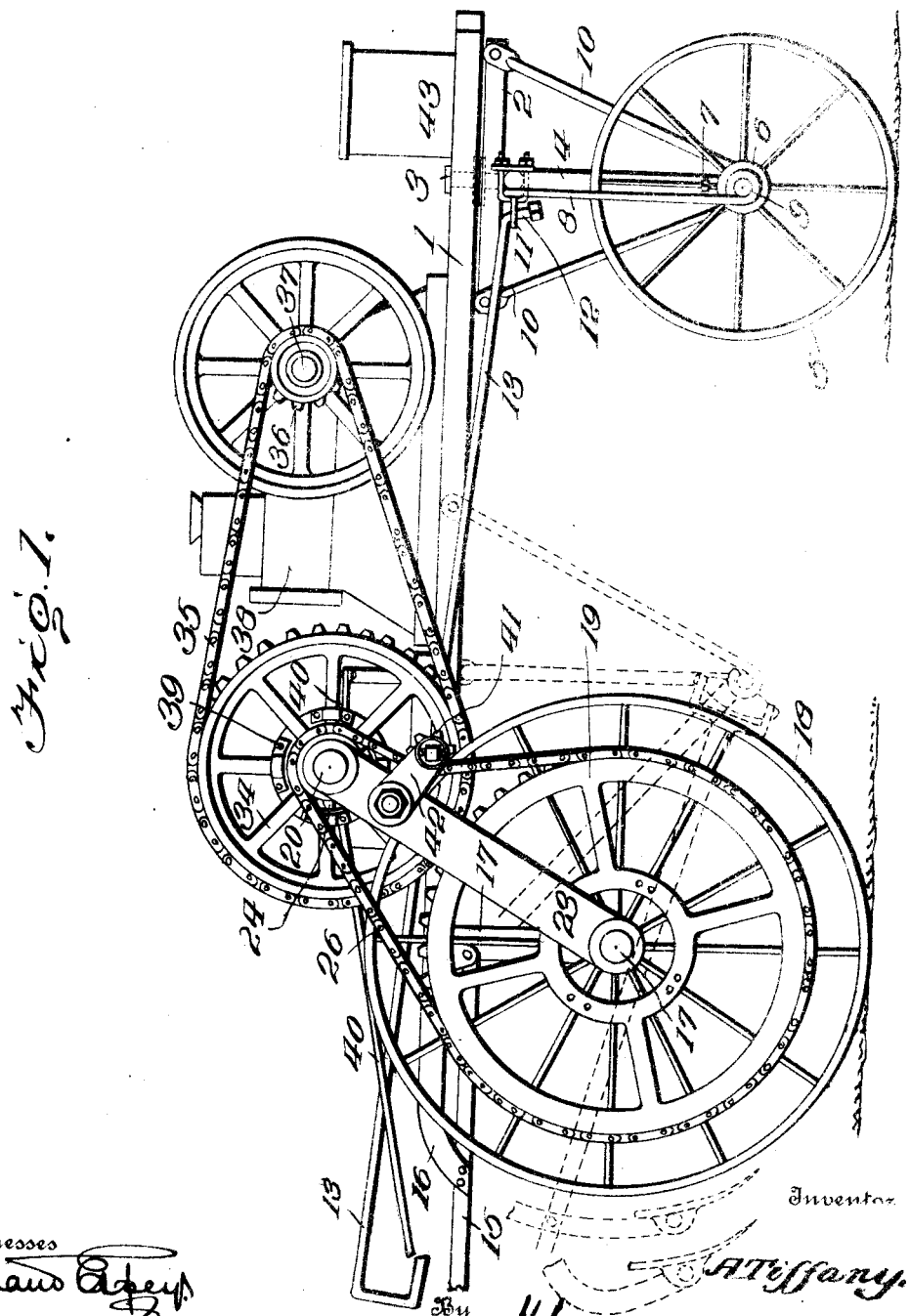

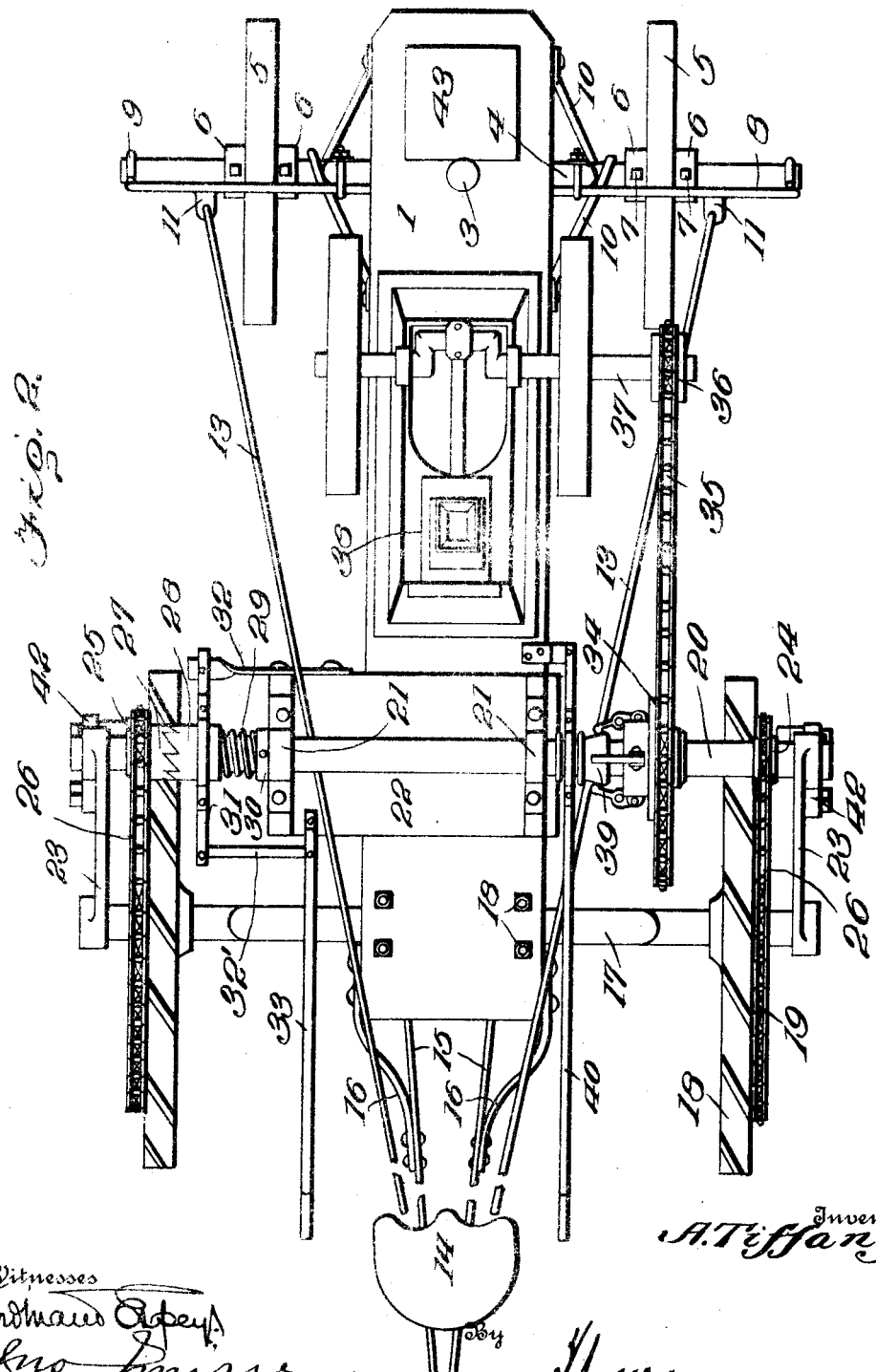

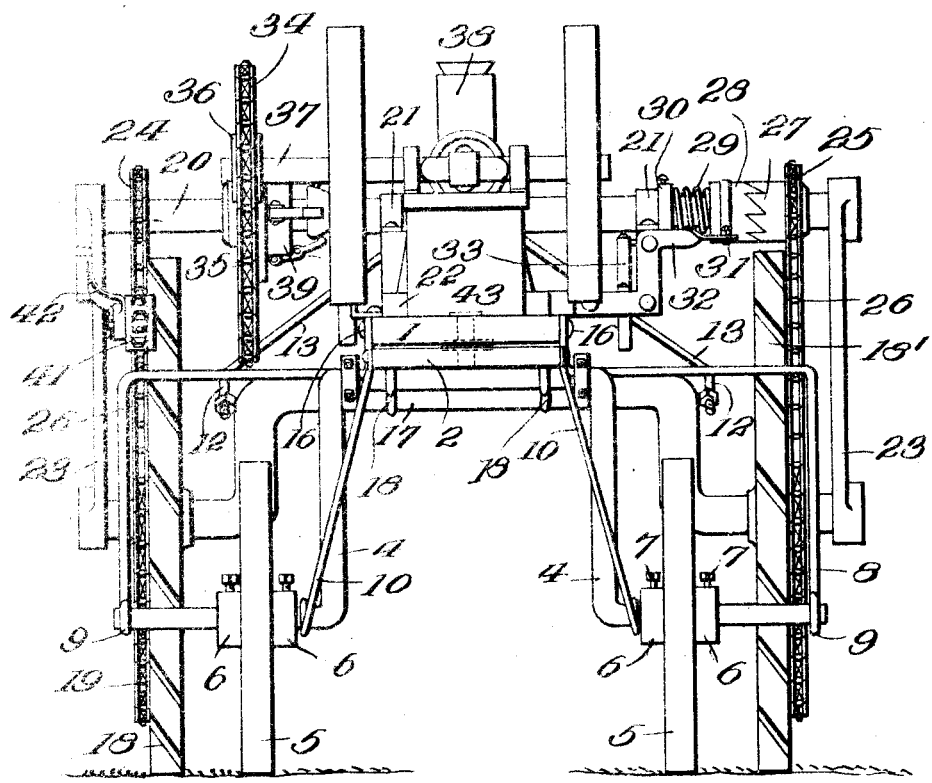

ADELBERT TIFFANY, OF SIOUX CITY, IOWA.

MOTOR-CARRIAGE FOR AGRICULTURAL IMPLEMENTS.

1,120,105.

Specification of Letters Patent.

Patented Dec. 8, 1914.

Application filed June 20, 1913. Serial No. 774,902.

*To all whom it may concern:*

Be it known that I, ADELBERT TIFFANY, citizen of the United States, residing at Sioux City, in the county of Woodbury and State of Iowa, have invented certain new and useful Improvements in Motor-Carriages for Agricultural Implements, of which the following is a specification.

This invention has for its object the provision of means whereby a cultivator or other agricultural instrument may be caused to travel over a field without the use of draft animals and may be easily steered in any desired direction.

A further object of the invention is to provide a carriage for agricultural implements which will be composed of few parts compactly arranged and capable of ready manipulation.

Other incidental objects of the invention will appear from the description hereinafter given.

The invention is illustrated in the accompanying drawings and consists in certain novel features which will be pointed out in the claims following the description.

In the drawings: Figure 1 is a side elevation of a carriage embodying my invention; Fig. 2 is a plan view of the same; Fig. 3 is a front elevation of the same.

In carrying out my invention, I employ a base or bed 1 which is supported at its front and rear ends by wheeled axles and may be of any preferred or convenient construction. In the drawings I have illustrated this bed or frame in the form of a continuous platform, but it is to be understood that the particular details of this platform are immaterial. To the said base 1 adjacent the front end thereof I secure a fifth wheel 2 by means of a king bolt 3 in the usual manner, and to the said fifth wheel 2 I secure an arched axle 4 upon the out-turned extremities of which are mounted ground wheels 5. These ground wheels are held against movement longitudinally of the axle by collars 6 disposed upon the axle at opposite sides of the wheels and secured to the axle by set screws 7, as shown and as will be readily understood. A transverse arched brace 8 is secured to the upper portion or cross bar of the arch of the axle and has its outer ends extending beyond the ground wheels and provided at their extremities with eyes 9 adapted to receive the ends of the axle. I thus provide an efficient support for the ends of the axle and also am enabled to adjust the steering wheels to the width of the rows of plants to be cultivated inasmuch as the wheels may be readily adjusted to any point between the vertical portions of the axle and the extreme ends thereof. The axle is further supported by front and rear inclined braces 10 consisting of rods having their lower ends fitted around the axle immediately adjacent the vertical portions thereof and their upper ends secured to the fifth wheel 2 in front and rear of the axle, as shown most clearly in Fig. 1. The transverse arched brace 8 is provided upon its upper portion with rearwardly projecting eyes or loops 11 in which are engaged the down-turned front ends 12 of steering rods 13 which extend rearwardly of the carriage and terminate adjacent the operator's seat 14 which is supported from the rear end of the bed 1. It will thus be readily seen that by shifting the steering rods 13 longitudinally the front steering axle may be turned to either side so that the carriage may be caused to travel in any desired direction. The seat 14 is secured upon the rear end of a frame 15 which is secured to and projects from the rear end of the bed 1 and is reinforced by braces 16 secured to the opposite sides or edges of the bed 1 at the rear end thereof and converge rearwardly from the bed to be secured to the frame 15, as clearly shown in Fig. 2. The rear axle 17 is also arched so as to clear the plants and is secured rigidly to the under side of the bed 1 at the rear end thereof by suitable clips and securing nuts indicated at 18.

Traction wheels 18 are rotatably mounted upon the outer ends of the axle and rigidly secured to the spokes of the said traction wheels and concentric with said wheels are sprocket wheels 19 to which motion is imparted from the counter shaft 20. This counter shaft 20 is mounted in suitable bearings 21 which are provided upon a cross bar 22 secured upon the bed 1, as clearly shown, and additional bearings and supports for said counter shaft are provided by standards or supporting arms 23 which are secured to the extremities of the rear axle 17 and extend upwardly therefrom to the extremities of the counter shaft. Sprocket pinions 24 and 25 are provided upon the counter shaft adjacent the ends thereof and sprocket chains 26 pass around the said pinions and the sprocket wheels 19 arranged immediately in rear of the respective pinions to transmit the motion of the counter shaft to the rear axle 17 and thereby cause the traction wheels to travel over the ground. The sprocket pinion 24 is fixed upon the countershaft while the pinion 25 is loose thereon and is provided upon its inner face with a clutch hub or member 27 having a ratcheted inner edge. This clutch hub or member 27 is normally engaged by a mating clutch member 28 which is slidably fitted upon the counter shaft but constrained to rotate therewith and held toward the clutch hub or member 27 by a spring 29 coiled upon the counter shaft between the said clutch member 28 and the adjacent bearing 21. I prefer to employ a collar 30 to receive the thrust of the inner end of the spring 29 and have illustrated such collar in the drawings, but it is to be understood that the omission of the said collar will involve no departure from my invention. The collar may be adjusted longitudinally of the shaft so that the tension of the spring may be regulated and maintained. The clutch member 28 is constructed with an annular groove in which fits a portion of a lever 31 having its front end fulcrumed upon a bracket 32 projecting laterally from the cross bar or member 22 of the frame as shown, the rear end of the said lever 31 being connected by a link 32' with a hand lever 33 which is fulcrumed at its front end upon the said cross bar 22 and extends rearwardly to a point adjacent the operator's seat 14. When it is desired to turn the carriage to the left the hand lever 33 is shifted so as to withdraw the clutch member 38 from its engagement with the clutch hub or member 27 and thereby permit the left hand traction wheel to remain approximately stationary while the carriage is turning. When the carriage is to be turned to the right the left hand traction wheel will travel at a greater speed than the counter shaft and the ratcheted face of the clutch hub 27 will automatically ride over and be disengaged from the mating face of the clutch member 28, as will be readily understood.

A sprocket wheel 34 is mounted upon the counter shaft 20 adjacent the right hand end thereof and a sprocket chain 35 is trained around the said sprocket wheel and a sprocket pinion 36 fixed upon the crank shaft 37 of an engine 38 which is mounted upon the bed 1. This engine will preferably be of the internal combustion type although any other form of motor may be employed and the detail construction and arrangement of the parts of the said motor constitute no part of my present invention. The motor is therefore illustrated in conventional manner only and it will be understood that it may be mounted upon the bed 1 in a manner most convenient to the user. The sprocket wheel 34 is fitted loosely upon the counter shaft and is adapted to be locked thereto by a friction clutch indicated generally at 39 and which may be of any well-known type. The slidable member of this friction clutch is controlled by a hand lever 40 which is fulcrumed upon the frame of the carriage in advance of the counter shaft and extends rearwardly to a point adjacent the operator's seat. By manipulating the hand lever 40 the clutch may be caused to lock the sprocket wheel to the counter shaft or release it from said shaft so that the carriage may be caused to travel or may be permitted to remain at rest without requiring the stoppage of the motor as is often desirable.

To compensate for the wear upon the chains 26 I provide a tension device in the form of an idler or pinion 41 carried by a bracket 42 which is pivotally secured to the standard or supporting arm 23 and may be secured in any desired angular relation to the said supporting arm or standard so as to carry the adjacent run of the chain 26 closer to or farther from the supporting arm, as will be readily understood.

The bed 1 of my improved carriage may be of any desired dimensions but should be sufficiently long to provide a proper support for the cultivator or other ground treating implements and the arches of the axles should be sufficiently high to clear the plants. While I have contemplated the use of the carriage more particularly in connection with cultivators as indicated by dotted lines in Fig. 1, it will be understood that plows, harrows or other machines may be connected with the bed of the carriage so as to be drawn over the field thereby. It will be readily noted that the rear axle, which receives the thrust of the driving power and also is required to sustain the greater portion of all shocks to which the carriage is subjected during its travel, is rigidly secured and the propelling force is applied at both ends thereof so that the machine will be propelled readily and will travel steadily. The standards or supporting bars connecting the rear axle with the counter shaft serve to brace both the axle and the counter shaft against torsional strain and the liability of the operating parts to get out of order is minimized.

A tool box 43 is illustrated upon the front end of the bed 1 and it will be understood of course that the unoccupied space upon the bed may be utilized to transport extra sprocket wheels or other parts or may be otherwise employed.

Having thus described my invention, what I claim is:

1. In an apparatus for the purpose set forth, the combination of a bed, an axle secured to the rear end of the said bed, traction wheels upon said axle, supporting bars fitted to the ends of the axle and rising therefrom, a counter shaft journaled in the upper ends of said bars, intermediate bearings for said counter shaft upon the bed, gearing connecting the counter shaft with the traction wheels, and means upon the bed for rotating the counter shaft.

2. In an apparatus for the purpose set forth, the combination with a bed, a counter shaft thereon, an axle secured to the rear end of the bed, traction wheels on the said axle, gearing connecting the counter shaft with the said traction wheels, and comprising a pinion loosely mounted upon the counter shaft, a clutch member fitted upon the counter shaft adjacent said pinion, a spring coiled around the counter shaft and bearing upon said clutch member to hold it normally in engagement with said pinion, a lever engaging said clutch member, said lever being fulcrumed in advance of said clutch member, a hand lever fulcrumed upon the bed and extending rearwardly therefrom, and a link connecting said hand lever with the rear end of the first-mentioned lever.

In testimony whereof I affix my signature in presence of two witnesses.

ADELBERT TIFFANY.

Witnesses:
H. W. BRACKREY,
JNO. R. CARTER.